(12) United States Patent
Minezawa et al.

(10) Patent No.: US 10,100,698 B2
(45) Date of Patent: Oct. 16, 2018

(54) EXHAUST PURIFICATION SYSTEM

(71) Applicant: ISUZU MOTORS LIMITED, Tokyo (JP)

(72) Inventors: Masanobu Minezawa, Fujisawa (JP); Shin Amagasaki, Fujisawa (JP); Yasuhisa Oomura, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 2 days.

(21) Appl. No.: 15/309,774

(22) PCT Filed: Apr. 28, 2015

(86) PCT No.: PCT/JP2015/062796
§ 371 (c)(1),
(2) Date: Nov. 8, 2016

(87) PCT Pub. No.: WO2015/170643
PCT Pub. Date: Nov. 12, 2015

(65) Prior Publication Data
US 2017/0191394 A1    Jul. 6, 2017

(30) Foreign Application Priority Data
May 8, 2014    (JP) .................................. 2014-096738

(51) Int. Cl.
*F01N 3/20*    (2006.01)
*F01N 11/00*    (2006.01)
(Continued)

(52) U.S. Cl.
CPC ......... *F01N 3/208* (2013.01); *B01D 53/9418* (2013.01); *B01D 53/9495* (2013.01);
(Continued)

(58) Field of Classification Search
CPC ...... F01N 3/2066; F01N 3/208; F01N 11/007; F01N 13/008; F01N 2550/05;
(Continued)

(56) References Cited

U.S. PATENT DOCUMENTS

2004/0112043 A1    6/2004    Matsubayashi et al.
2010/0024394 A1    2/2010    Kitazawa
(Continued)

FOREIGN PATENT DOCUMENTS

CN    101578436 A    11/2009
CN    102892989 A    1/2013
(Continued)

OTHER PUBLICATIONS

International Search Report and Written Opinion for PCT App No. PCT/JP2015/062796 dated Jul. 28, 2015, 9 pgs.
(Continued)

*Primary Examiner* — Audrey K Bradley
(74) *Attorney, Agent, or Firm* — Procopio, Cory, Hargreaves & Savitch LLP (57) ABSTRACT

An exhaust purification system that includes a selective catalytic reduction to purify NOx contained in an exhaust gas by using ammonia produced from urea water and an NOx sensor to acquire a value of the NOx contained in the exhaust gas, and the exhaust purification system includes: a reach time measurement unit that measures a reach time of the NOx value acquired by the NOx sensor, the reach time being a required time for the NOx value to reach, from a first predetermined determinative NOx value, a second predetermined determinative NOx value, which is higher than the first determinative NOx value; and a determination unit that determines that malfunction occurs in the NOx sensor when the reach time measured by the reach time measurement unit is equal to or shorter than a first predetermined determinative time.

5 Claims, 4 Drawing Sheets

(51) Int. Cl.
*F01N 13/00* (2010.01)
*B01D 53/94* (2006.01)

(52) U.S. Cl.
CPC .......... *F01N 3/2066* (2013.01); *F01N 11/007* (2013.01); *F01N 13/008* (2013.01); *F01N 2550/05* (2013.01); *F01N 2560/026* (2013.01); *F01N 2610/02* (2013.01); *F01N 2610/146* (2013.01); *F01N 2900/1616* (2013.01)

(58) Field of Classification Search
CPC .......... F01N 2560/026; F01N 2610/02; F01N 2610/146; F01N 2900/1616; B01D 53/9418; B01D 53/9495
See application file for complete search history.

(56) References Cited

U.S. PATENT DOCUMENTS

| | | | |
|---|---|---|---|
| 2010/0031633 A1* | 2/2010 | Kitazawa | F01N 3/0807 60/276 |
| 2012/0085143 A1 | 4/2012 | Sakurai et al. | |
| 2012/0117954 A1 | 5/2012 | Yasui et al. | |
| 2012/0255277 A1* | 10/2012 | Rajagopalan | F02D 41/123 60/274 |
| 2013/0055803 A1 | 3/2013 | Takahashi et al. | |

FOREIGN PATENT DOCUMENTS

| | | |
|---|---|---|
| JP | 2002115526 A | 4/2002 |
| JP | 2003-293738 A | 10/2003 |
| JP | 2009-257888 A | 11/2009 |
| JP | 2010-174695 A | 8/2010 |
| JP | 2011241722 A | 12/2011 |
| JP | 2012-082710 A | 4/2012 |
| JP | 2013-181411 A | 9/2013 |
| JP | 2013-185575 A | 9/2013 |
| JP | 2013224613 A | 10/2013 |

OTHER PUBLICATIONS

Office Action for CN App No: 201580023225.1 dated Jul. 20, 2018, 5 pgs.

* cited by examiner

FIG.6 ant a US 10,100,698 B2

EXHAUST PURIFICATION SYSTEM

TECHNICAL FIELD

The present invention relates to an exhaust purification system, and more particularly, to an exhaust purification system including a selective catalytic reduction catalyst (hereinafter, referred to as an SCR) that reduces and purifies NOx contained in an exhaust gas.

BACKGROUND ART

In the background art, there is known an exhaust purification system including an SCR that selectively reduces and purifies NOx contained in an exhaust gas using ammonia (hereinafter, referred to as NH3) as a reducing agent, the NH3 being generated by hydrolysis from urea water. In such an exhaust purification system, the injection amount of urea water is feedback-controlled such that a value of NOx contained in an exhaust gas becomes a target value based on a sensor value of an NOx sensor provided at an exhaust downstream side of the SCR (for example, see Patent Literatures 1 and 2).

CITATION LIST

Patent Literatures

Patent Literature 1: Japanese Unexamined Patent Application Publication No. 2003-293738
Patent Literature 2: Japanese Unexamined Patent Application Publication No. 2013-181411

SUMMARY OF INVENTION

Technical Problem

Incidentally, the amount of NH3 adsorbable in the SCR tends to decrease in accordance with a temperature rise of a catalyst. For this reason, when an exhaust temperature sharply rises due to a forced regeneration or the like of a diesel particulate filter (hereinafter, referred to as DPF), some amount of NH3 is likely to be separated from the SCR and released to the downstream side, thereby causing so-called an NH3 slip.

Since a general NOx sensor cannot distinguish between NOx and NH3, when the NH3 slip occurs, the NOx sensor will indicate a high NOx value. In addition, when the internal processing of the NOx sensor is delayed due to the sudden change of an exhaust flow rate during actuation or sudden acceleration of an exhaust brake or the influence of hydrocarbon (HC) contained in an exhaust gas, the sensor value of the NOx sensor may suddenly temporarily increase greater than an actual NOx value.

For this reason, in a system in which the injection amount of urea water is feedback-controlled based on the sensor value of the NOx sensor, the sensor value may show sudden increase, or the NH3 slip may be erroneously recognized as a discharge of excessive NOx, whereby the urea water may be excessively injected. Furthermore, for example, in a system in which abnormality diagnosis is performed based on the sensor value of the NOx sensor, an erroneous diagnosis may be performed, which turns out stopping an injection of urea water, generating an abnormality alarm, and so on. That is, in order to suppress the excessive injection of urea water or the erroneous diagnosis, it is important to accurately determine whether the sudden increase in the sensor value of the NOx sensor is resulted from a malfunction of the NOx sensor or a temporary response defection of the system, or from an influence of the NH3 slip.

An object of the invention is to provide an exhaust purification system that can effectively determine when malfunction of the NOx sensor occurs when the sensor value of the NOx sensor increases suddenly.

Solution to Problem

In order to achieve the above-described object, an exhaust purification system of the invention includes a selective catalytic reduction catalyst that is provided in an exhaust passage of an internal combustion engine to purify NOx contained in an exhaust gas by using ammonia produced from urea water as a reducing agent and an NOx sensor that is provided in the exhaust passage to acquire a value of the NOx contained in the exhaust gas and is characterized by including: a reach time measurement unit that measures a reach time of the NOx value acquired by the NOx sensor, the reach time being a required time for the NOx value to reach, from a first predetermined determinative NOx value, a second predetermined determinative NOx value, which is higher than the first determinative NOx value; and a determination unit that determines that malfunction occurs in the NOx sensor when the reach time measured by the reach time measurement unit is equal to or shorter than a first predetermined determinative time.

Preferably, the determination unit determines that a temporary response defection occurs in the NOx sensor when the reach time measured by the reach time measurement unit is equal to or shorter than a second predetermined determinative time that is longer than the first determinative time.

Preferably, the NOx sensor is provided at a downstream side of the selective catalytic reduction catalyst in the exhaust passage, and the determination unit determine an occurrence of an ammonia slip, which at least some amount of ammonia adsorbed in the selective catalytic reduction catalyst is detached, in a case where the reach time measured by the reach time measurement unit is equal to or shorter than a third predetermined determinative time that is longer than the second determinative time.

Preferably, the exhaust purification system further includes: an injection controller that controls the amount of urea water to be injected to the selective catalytic reduction catalyst based on the value detected by the NOx sensor; a diagnosis unit that performs abnormality diagnosis based on the value detected by the NOx sensor; a suppression unit that decreases the amount of urea water to be injected by the controller when the determination unit determines that the temporary response defection occurs in the NOx sensor or the ammonia slip has occurred; and a prohibition unit that prohibits the diagnosis unit from performing the abnormality diagnosis when the determination unit determines that the temporary response defection occurs in the NOx sensor or the ammonia slip has occurred.

Preferably, the exhaust purification system further includes: a stability determination unit that calculates an average NOx value obtained by taking an average on the NOx values acquired within a predetermined period by the NOx sensor and determines that the NOx value is in a stable state in the exhaust gas when the average NOx value is equal to or less than the first determinative NOx value; and a determination-condition calculation unit that calculates the second determinative NOx value according to the average NOx value calculated by the stability determination unit.

DESCRIPTION OF EMBODIMENTS

Hereinafter, an exhaust purification system according to an embodiment of the invention will be described with reference to the accompanying drawings. Identical components are designated by identical reference numerals, and such identical components have like names and functions. Accordingly, detailed descriptions of such identical components will not be repeated.

Figure 1:
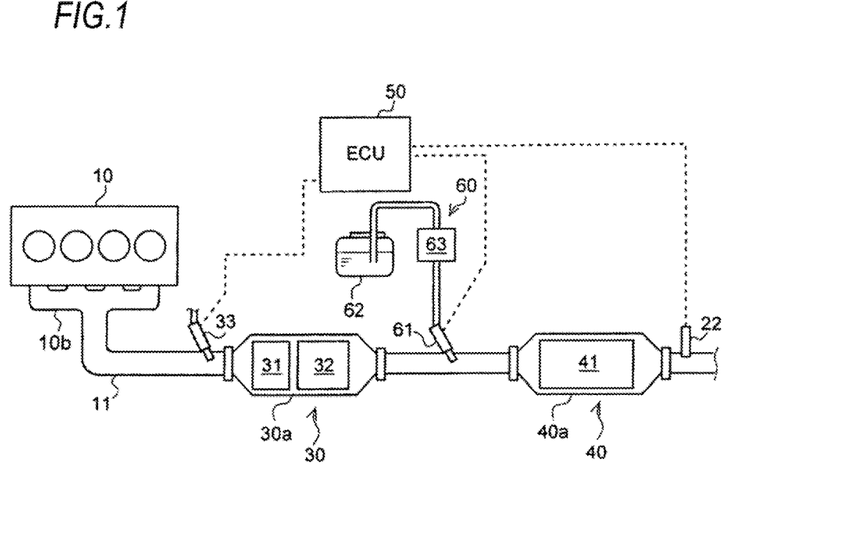
FIG. 1 is a schematic overall configuration diagram illustrating an exhaust purification system according to an embodiment of the invention.

As illustrated in FIG. 1, an exhaust manifold 10b of a diesel engine (hereinafter, simply referred to as an engine) 10 is connected to an exhaust passage 11 through which an exhaust gas is discharged to the atmosphere. The exhaust passage 11 is provided with a upstream post-treatment device 30, a downstream post-treatment device 40, and so on in this order from the upstream side in the exhaust gas flowing direction.

The upstream post-treatment device 30 includes a catalyst casing 30a, and an oxidation catalyst (hereinafter, referred to as "DOC") 31 and a DPF 32 are disposed in the catalyst casing 30a in this order from the upstream side. In addition, a fuel injection device (fuel adding valve) 33 is provided in the exhaust passage 11 upstream from the DOC 31.

The fuel injection device 33 injects unburned fuel (mainly HC) into the exhaust passage 11 in response to an instruction signal input from an electronic control unit (hereinafter, referred to as "ECU") 50. Additionally, in a case where post-injection by means of multi-stage injection of the engine 10 is employed, the fuel injection device 33 may be omitted.

The DOC 31 includes, for example, a ceramic carrier having a cordierite honeycomb structure, with catalytic components supported on a surface of the ceramic carrier. When the HC is supplied to the DOC 31 through the fuel injection device 33 or the post-injection, the DOC 31 oxidizes the HC, thereby causing the temperature of the exhaust gas to rise.

The DPF 32 has, for example, a number of cells defined by porous partition walls and disposed along a stream direction of the exhaust gas, the upstream and downstream sides of the cells being sealed alternately. The DPF 32 collects PM in the exhaust gas into pores as well as on the surfaces of the partition walls. When the amount of accumulated PM reaches a predetermined amount, so-called a forced regeneration is carried out to burn and remove the accumulated PM(particulate matters). The forced regeneration is performed by supplying the unburned fuel (HC) to the DOC 31 through the fuel injection device 33 or the post-injection and raising the temperature of the exhaust gas introducing into the DPF 32 up to a PM combustion temperature.

The downstream post-treatment device 40 is configured to include an SCR 41 in a casing 40a. A urea water injecting device 60 is provided upstream from the SCR 41 on the exhaust passage 11, and an NOx sensor 22 is provided at a downstream side of the SCR41 on the exhaust passage 11.

The urea water injecting device 60 opens and closes a urea adding valve 61 in response to an instruction signal input from the ECU 50, and thus injects urea water, which is pumped from the inside of a urea water tank 62 by a urea water pump 63, into the exhaust passage 11 upstream from the SCR 41. The injected urea water is hydrolyzed by the exhaust heat, whereby NH3 is produced and supplied to the SCR 41 on the downstream side as a reducing agent.

The SCR 41 is formed, for example, of a ceramic carrier having a honeycomb structure to have zeolite or the like supported on a surface of the ceramic carrier. The SCR 41 includes a number of cells defined by porous partition walls. The SCR 41 adsorbs NH3 supplied as the reducing agent, and selectively reduces and purifies NOx contained in the exhaust gas passing therethrough with the adsorbed NH3.

The NOx sensor 22 detects a value of the NOx contained in the exhaust gas which has passed through the SCR 41 (hereinafter, referred to as an SCR outlet NOx value $NOx_{OUT}$). The SCR outlet NOx value $NOx_{OUT}$ detected by the NOx sensor 22 is transmitted to the ECU 50 which is electrically connected thereto.

Figure 2:
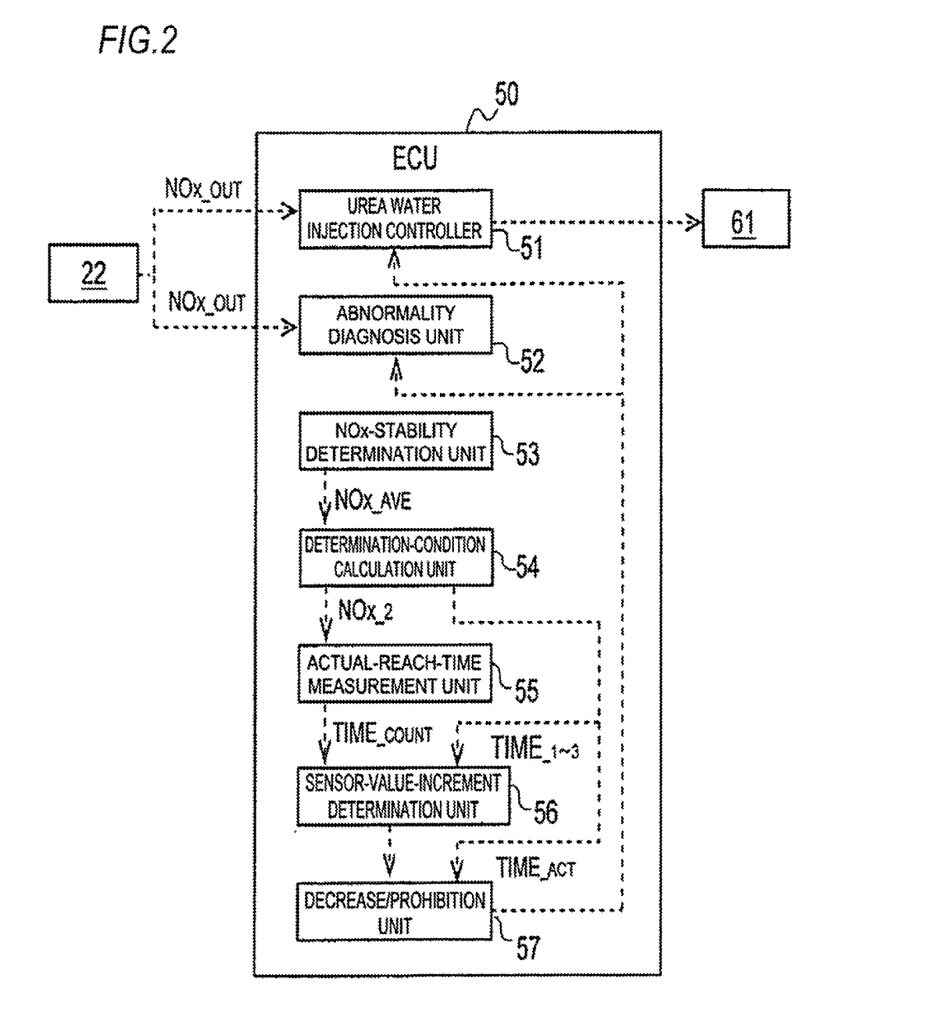
FIG. 2 is a functional block diagram illustrating an electronic control unit (ECU) according to the embodiment.

The ECU 50 performs various types of control, such as control of the engine 10, the fuel injection device 33, and the urea water injecting device 60, and includes a CPU, a ROM, a RAM, input ports, output ports, and so on which are known. As illustrated in FIG. 2, the ECU 50 also includes, as part of its functional elements, a urea water injection controller 51, an abnormality diagnosis unit 52, an NOx-stability determination unit 53, a determination-condition calculation unit 54, an actual-reach-time measurement unit 55, a sensor-value-increment determination unit 56, and a suppression/prohibition unit 57. It is assumed in the following description that all of these functional elements are included in the ECU 50, which is an integrated piece of hardware. Alternatively, one or more of these functional elements may be provided in a separate piece of hardware.

The urea water injection controller 51 performs a feedback control on the amount of urea water to be injected from the urea water injecting device 60, based on an SCR outlet NOx value $NOx_{OUT}$ input from the NOx sensor 22.

The abnormality diagnosis unit 52 executes abnormality diagnosis to represent an abnormality alarm when the NOx sensor 22 detects an abnormal value due to a significant decrease in NOx purification performance of the SCR 41, malfunction of the urea adding valve 61, or the like.

Figure 3:
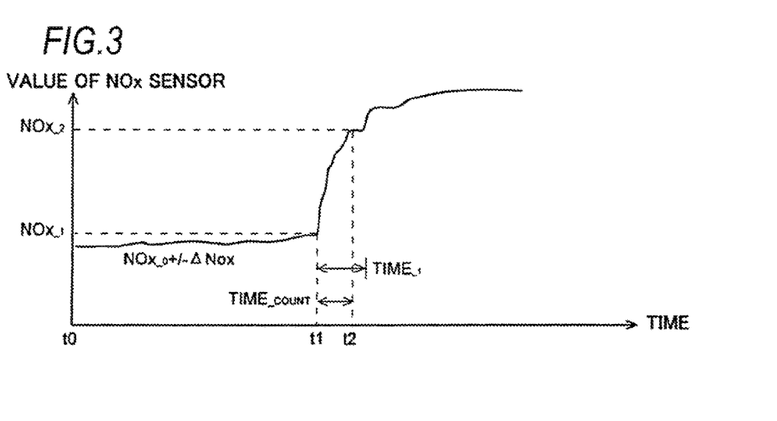
FIG. 3 is a time chart illustrating malfunction determination of an NOx sensor in the exhaust purification system according to the embodiment.

The NOx-stability determination unit 53 determines based on the SCR outlet NOx value $NOx_{OUT}$ input from the NOx sensor 22 whether the value of NOx contained in the exhaust gas having passed through the SCR 41 is in a stable state. More specifically, the NOx-stability determination unit 53 takes an average on the SCR outlet NOx values $NOx_{OUT}$ detected within a predetermined period by the NOx sensor 22, and thus calculates an average NOx value $NOx_{AVE}$ (moving average) within the predetermined period in real time. Then, if the calculated average NOx value $NOx_{AVE}$ is lower than a predetermined first determinative NOx value $NOx_1$ and comes within the range of a stability NOx value $NOx_0 \pm \Delta NOx$, the NOx-stability determination unit 53 determines that the NOx value at the downstream side of the SCR 41 is in a stable state (see time from t0 to t1 in FIGS. 3 to 5).

When the NOx-stability determination unit 53 determines that the value of NOx contained in the exhaust gas is in the stable state, the determination-condition calculation unit 54 calculates: (1) malfunction determinative time $TIME_1$, (2) response defection determinative time $TIME_2$, (3) NH3-slip determinative time $TIME_3$, (4) maximum standby time $TIME_{up}$, (5) processing prohibition time $TIME_{ACT}$, and (6) second determinative NOx value $NOx_2$, which are used for a sensor-value-increment determination or decrease of injection amount/diagnosis prohibition to be described below.

The malfunction determinative time $TIME_1$ is an example of a determination condition for determining whether the malfunction of the NOx sensor 22 occurs, and is calculated according to the average NOx value $NOx_{AVE}$. The response defection determinative time $TIME_2$ is an example of a determination condition for determining whether a temporary response defection occurs in the NOx sensor 22, and is calculated according to the average NOx value $NOx_{AVE}$. The NH3-slip determinative time $TIME_3$ is an example of a determination condition for determining whether an NH3 slip has occurred from the SCR 41, and is calculated according to the average NOx value $NOx_{AVE}$. The malfunction determinative time $TIME_1$ is set to be a shorter time than the response defection determinative time $TIME_2$ ($TIME_1 < TIME_2$), and the response defection determinative time $TIME_2$ is set to be a shorter time than the NH3-slip determinative time $TIME_3$ ($TIME_2 < TIME_3$).

The maximum standby time $TIME_{up}$ is a standby time required for initializing various determination conditions described above when the SCR outlet NOx value $NOx_{OUT}$ detected by the NOx sensor 22 does not reach the second determinative NOx value $NOx_2$, and is calculated according to the average NOx value $NOx_{AVE}$ or is set as an arbitrary time which is determined in advance. The processing prohibition time $TIME_{ACT}$ is a time required for decreasing the injection amount of urea water and prohibiting abnormality diagnosis when the sensor value of the NOx sensor 22 suddenly increases, and is calculated according to the average NOx value $NOx_{AVE}$. The second determinative NOx value $NOx_2$ is a value higher than the first determinative NOx value $NOx_1$, and is calculated according to the average NOx value $NOx_{AVE}$. The second determinative NOx value $NOx_2$ can also be individually set for each determination.

The actual-reach-time measurement unit 55 measures, as an actual reach time $TIME_{COUNT}$, a time until the SCR outlet NOx value $NOx_{OUT}$ detected by the NOx sensor 22 reaches the second determinative NOx value $NOx_2$ after exceeding the first NOx value $NOx_1$ (see time from t1 to t2 in FIGS. 3 to 5) by using a timer built in the ECU 50.

The sensor-value-increment determination unit 56 determines malfunction or temporary response defection of the NOx sensor 22 and occurrence of the NH3 slip, based on the actual reach time $TIME_{COUNT}$ measured by the actual-reach-time measurement unit 55. More specifically, when the actual reach time $TIME_{COUNT}$ is equal to or shorter than the malfunction determinative time $TIME_1$ (see FIG. 3), the sensor-value-increment determination unit 56 determines that the malfunction of the NOx sensor 22 occurs. In addition, when the actual reach time $TIME_{COUNT}$ is longer than the malfunction determinative time $TIME_1$ and is equal to or shorter than the response defection determinative time $TIME_2$ (see FIG. 4), the sensor-value-increment determination unit 56 determines that the temporary response defection has occurred in the NOx sensor 22. Further, when the actual reach time $TIME_{COUNT}$ is longer than the response defection determinative time $TIME_2$ and is equal to or shorter than the NH3-slip determinative time $TIME_3$ (see FIG. 5), the sensor-value-increment determination unit 56 determines that the NH3 slip has occurred.

Figure 4:
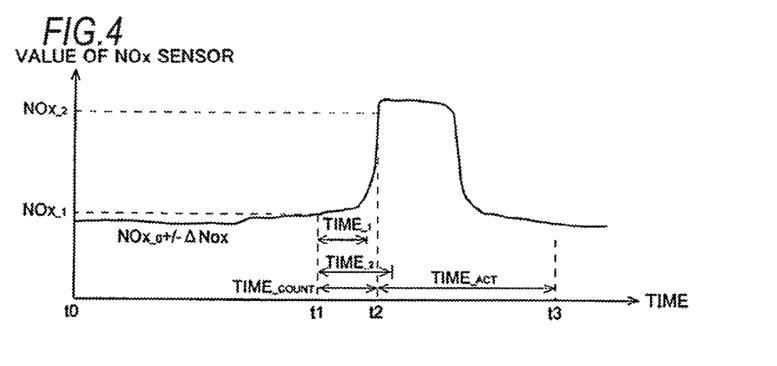
FIG. 4 is a time chart illustrating response defection determination of the NOx sensor in the exhaust purification system according to the embodiment.
Figure 5:
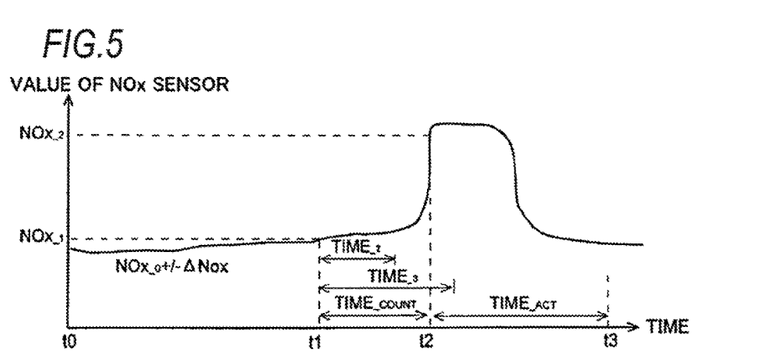
FIG. 5 is a time chart illustrating NH3-slip determination in the exhaust purification system according to the embodiment.

When the sensor-value-increment determination unit 56 determines that the temporary response defection has occurred in the NOx sensor 22 or the NH3 slip has occurred, the suppression/prohibition unit 57 decreases the amount of urea water injected by the urea water injection controller 51 and prohibits abnormality diagnosis by the abnormality diagnosis unit 52 until the processing prohibition time $TIME_{ACT}$ has elapsed from a time where the SCR outlet NOx value $NOx_{OUT}$ exceeds the second determinative NOx value $NOx_2$ (see time from t2 to t3 in FIGS. 4 and 5).

Figure 6:
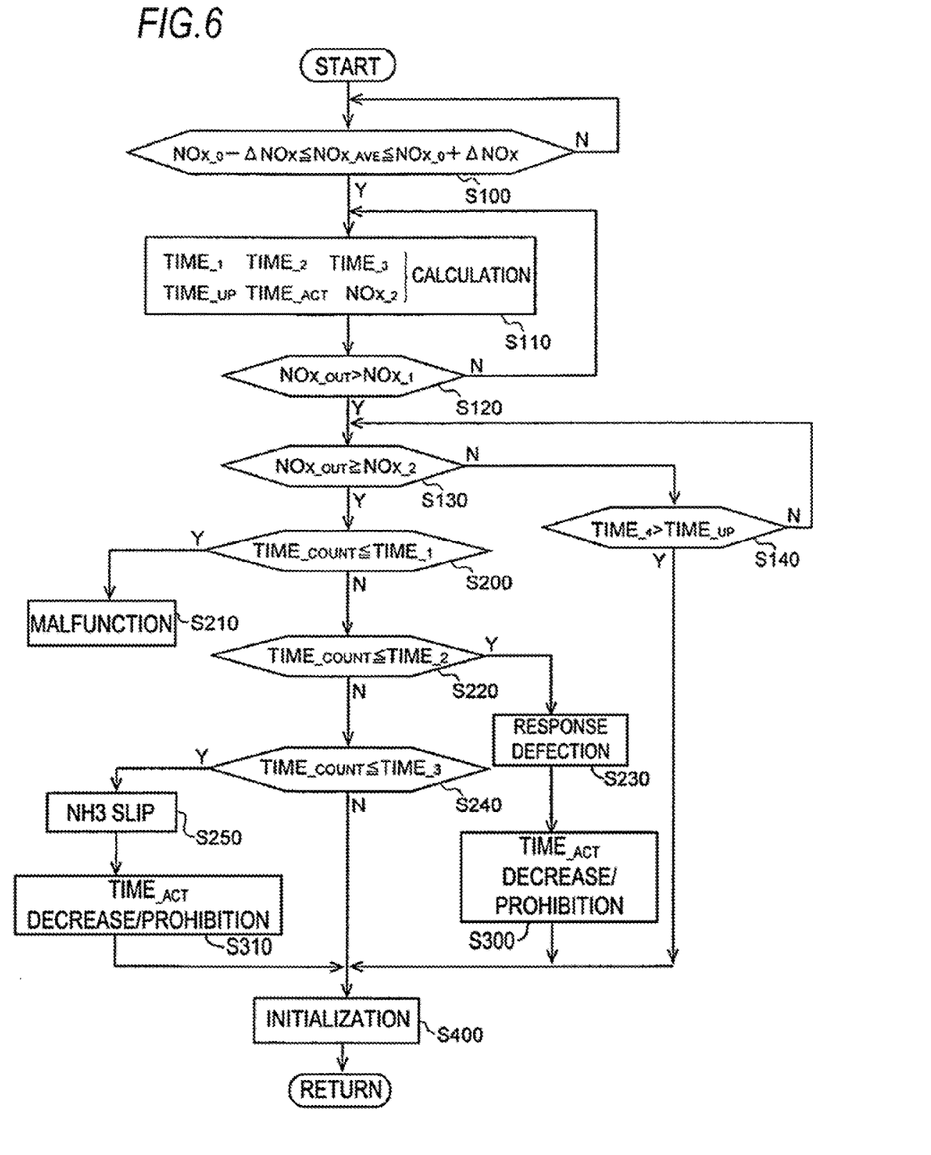
FIG. 6 is a flowchart illustrating an example of a control process in the exhaust purification system according to the embodiment of the invention.

A control process of the exhaust purification system according to this embodiment will now be described below with reference to FIG. 6. The process illustrated in FIG. 6 is executed in parallel with the injection control of urea water by the urea water injection controller 51 and the abnormality diagnosis by the abnormality diagnosis unit 52.

In step 100 (hereinafter, the term "step" is abbreviated as "S"), it is determined, based on the average NOx value $NOx_{AVE}$ obtained by a moving average of the SCR outlet NOx value $NOx_{OUT}$ detected within the predetermined period by the NOx sensor 22, whether the NOx value at the downstream side of the SCR 41 is in a stable state. When the average NOx value $NOx_{AVE}$ comes within the range of the stability NOx value $NOx_0 \pm \Delta NOx$ (Yes), it is determined that the NOx value at the downstream side of the SCR 41 is in the stable state, and the control process proceeds to S110.

In S110, based on the average NOx value $NOx_{AVE}$ being in the stable state calculated in S100, a calculation is made on (1) malfunction determinative time $TIME_1$, (2) response defection determinative time $TIME_2$, (3) NH3-slip determinative time $TIME_3$, (4) maximum standby time $TIME_{up}$, (5) processing prohibition time $TIME_{ACT}$, and (6) second determinative NOx value $NOx_2$, which are used for the sensor-value-increment determination or the decrease of injection amount/diagnosis prohibition.

In S120, it is determined whether the SCR outlet NOx value $NOx_{OUT}$ detected by the NOx sensor 22 exceeds the firsts determinative NOx value $NOx_1$. When the SCR outlet NOx value $NOx_{OUT}$ exceeds the first determinative NOx value $NOx_1$ (Yes), a timer starts time measurement, and the control process proceeds to S130.

In S130, it is determined whether the SCR outlet NOx value $NOx_{OUT}$ detected by the NOx sensor 22 reaches the second determinative NOx value $NOx_2$. When the SCR outlet NOx value $NOx_{OUT}$ does not reach the second determinative NOx value $NOx_2$ (No), the control process proceeds to S140.

In S140, it is determined whether a measurement time $TIME_4$ started by the timer from S120 reaches the maximum standby time $TIME_{up}$. When the measurement time $TIME_4$ reaches the maximum standby time $TIME_{up}$ (Yes), since NOx gradually increases and the sensor value of the NOx sensor 22 can be trustworthy, the control process proceeds to S400, various determination conditions calculated in S110 are initialized and are returned.

When it is determined in S130 that the SCR outlet NOx value $NOx_{OUT}$ reaches the second determinative NOx value $NOx_2$ (Yes), the control process proceeds to S200. In S200, it is determined whether the time until the SCR outlet NOx value $NOx_{OUT}$ reaches the second determinative NOx value $NOx_2$ after exceeding the first determinative NOx value $NOx_1$, that is, the actual reach time $TIME_{COUNT}$ is equal to or shorter than the malfunction determinative time $TIME_1$. When the actual reach time $TIME_{COUNT}$ is equal to or shorter than the malfunction determinative time $TIME_1$ (Yes), the control process proceeds to S210, and it is determined that the malfunction of NOx sensor 22 occurs. On the other hand, when it is determined in S200 that the actual reach time $TIME_{COUNT}$ is equal to or longer than the malfunction determinative time $TIME_1$ (No), the control process proceeds to S220.

In S220, it is determined whether the actual reach time $TIME_{COUNT}$ is equal to or shorter than the response defection determinative time $TIME_2$. When the actual reach time $TIME_{COUNT}$ is equal to or shorter than the response defection determinative time $TIME_2$ (Yes), the control process proceeds to S230, and it is determined that temporary response defection malfunction occurs in the NOx sensor 22. Thereafter, the control process proceeds to S300, the injection amount of urea water is decreased and the abnormality diagnosis is prohibited until the processing prohibition time $TIME_{ACT}$ has elapsed from a time point of S130. Furthermore, the control process proceeds to S400, various determination conditions calculated in S110 are initialized and are returned. On the other hand, when the actual reach time $TIME_{ACT}$ is longer than the malfunction determinative time $TIME_1$ in S220 (No), the control process proceeds to S240.

In S240, it is determined whether the actual reach time $TIME_{COUNT}$ is equal to or shorter than the NH3-slip determinative time $TIME_3$. When the actual reach time $TIME_{COUNT}$ is equal to or shorter than the NH3-slip determinative time $TIME_3$ (Yes), the control process proceeds to S250, and it is determined that the NH3 slip has occurred. Thereafter, the control process proceeds to S310, the injection amount of urea water is decreased and the abnormality diagnosis is prohibited until the processing prohibition time $TIME_{ACT}$ has elapsed from a time point of S130. Furthermore, the control process proceeds to S400, various determination conditions calculated in S110 are initialized and are returned. On the other hand, when the actual reach time $TIME_{ACT}$ is longer than the NH3-slip determinative time $TIME_3$ in S240 (No), the NH3 slip does not occur and the sensor value of the NOx sensor 22 can be trustworthy. Therefore, the control process proceeds to S400, various determination conditions calculated in S110 are initialized and are returned.

Operational effects of the exhaust purification system according to this embodiment will be described below.

In general, since the NOx sensor 22 cannot distinguish between NOx and NH3, when the NH3 slip occurs, the NOx sensor 22 indicates a high NOx value. In addition, when the internal processing of the NOx sensor 22 is delayed due to the sudden change of the exhaust flow rate or the influence of HC contained in the exhaust gas, the sensor value of the NOx sensor 22 may suddenly temporarily increase greater than the actual NOx value. For this reason, there is a possibility to deteriorate the NH3 slip due to the excessive injection or urea water in a system in which the injection amount of urea water is feedback-controlled based on the sensor value of the NOx sensor 22. Further, there is a possibility to perform, for example, a stop of injection of urea water or erroneous diagnosis to alert an abnormality alarm in a system in which the abnormality diagnosis is performed based on the sensor value of the NOx sensor 22.

According to the exhaust purification system of this embodiment, the actual reach time $TIME_{COUNT}$ until the sensor value of the NOx sensor 22 is rapidly increased to the second determinative NOx value $NOx_2$ from the first determinative NOx value $NOx_1$ is measured, the malfunction of the NOx sensor 22 is determined when the actual reach time $TIME_{COUNT}$ is equal to or shorter than the malfunction determinative time $TIME_1$, the temporary response defection of the NOx sensor 22 is determined when the actual reach time $TIME_{COUNT}$ is equal to or shorter than the response defection determinative time $TIME_2$, and the NH3 slip is determined when the actual reach time $TIME_{COUNT}$ is equal to or shorter than the NH3-slip determinative time $TIME_3$. In the case of the temporary response defection or the NH3 slip, the exhaust purification system of this embodiment is configured to decrease the injection amount of urea water and prohibit the abnormality diagnosis until the predetermined period has elapsed.

Accordingly, it is possible to effectively determine the malfunction of the NOx sensor 22 or the temporary response defection, and the NH3 slip and to effectively suppress the excessive injection of urea water and the erroneous diagnosis during the temporary response defection of the NOx sensor 22 or the NH3-slip occurrence. Further, since the excessive injection of urea water is prevented, corrosion of an exhaust pipe or performance deterioration of the SCR 41 caused by adhesion of the urea water can also be effectively prevented.

The invention is not limited to the above-described embodiment, and various changes and modifications may be appropriately made without departing from the scope of the invention.

For example, it is assumed that the decrease in the injection amount of urea water or the prohibition of the abnormality diagnosis is continued until the processing prohibition time $TIME_{ACT}$ has elapsed, but the exhaust purification system may be configured such that the decrease and prohibition are maintained until the sensor value of the NOx sensor 22 is stabilized at a predetermined value. In addition, the malfunction determination or the response defection determination are also applicable to a system in which the NOx 22 is provided upstream of the SCR 41. In addition, the engine 10 is not limited to a diesel engine, but may be widely applicable to other internal combustion engines such as a gasoline engine.

The invention claimed is:
1. An exhaust purification system comprising:
a selective catalytic reduction catalyst that is provided in an exhaust passage of an internal combustion engine to purify NOx contained in an exhaust gas by using ammonia produced from urea water as a reducing agent;
an NOx sensor that is provided in the exhaust passage to acquire a value of the NOx contained in the exhaust gas; and
a controller;
wherein the controller:
determines than an average NOx value is in a stable state by comparing it to a stability NOx value;
measures a reach time of the NOx value acquired by the NOx sensor, the reach time being a required time for the NOx value to reach, from a first predetermined determinative NOx value, a second predetermined determinative NOx value, which is higher than the first determinative NOx value; and determines that malfunction occurs in the NOx sensor when the reach time is equal to or shorter than a first predetermined determinative time, wherein the first predetermined determinative NOx value is larger than the stability NOx value.

2. The exhaust purification system according to claim 1, wherein the controller determines that a temporary response defection occurs in the NOx sensor when the reach time is equal to or shorter than a second predetermined determinative time that is longer than the first determinative time.

3. The exhaust purification system according to claim 2, wherein the NOx sensor is provided at a downstream side of the selective catalytic reduction catalyst in the exhaust passage, and wherein the controller determines that an ammonia slip has occurred, that is, at least some of ammonia adsorbed in the selective catalytic reduction catalyst is detached when the reach time is equal to or shorter than a third predetermined determinative time that is longer than the second determinative time.

4. The exhaust purification system according to claim 3: wherein the controller;

controls the amount of urea water to be injected to the selective catalytic reduction catalyst based on the value detected by the NOx sensor;

performs abnormality diagnosis based on the value detected by the NOx sensor;

decreases the amount of urea water to be injected by the controller when the controller determines that the temporary response defection occurs in the NOx sensor or the ammonia slip has occurred; and prohibits from performing the abnormality diagnosis when the controller determines that the temporary response defection occurs in the NOx sensor or the ammonia slip has occurred.

5. The exhaust purification system according to claim 1, wherein the controller;

calculates an average NOx value obtained by taking an average on the NOx values acquired within a predetermined period by the NOx sensor and determines that the NOx value is in a stable state in the exhaust gas when the average NOx value is equal to or less than the first determinative NOx value; and calculates the second determinative NOx value according to the average NOx value calculated by the controller.

* * * * *